US008406816B2

(12) United States Patent
Marui et al.

(10) Patent No.: US 8,406,816 B2
(45) Date of Patent: Mar. 26, 2013

(54) METHOD AND APPARATUS FOR IMPLEMENTING A VIRTUAL ROTARY DIAL PAD ON A PORTABLE ELECTRONIC DEVICE

(75) Inventors: Keizo Marui, Waterloo (CA); Brian Groux, Hamilton (CA)

(73) Assignee: Research In Motion Limited, Waterloo (CA)

( * ) Notice: Subject to any disclaimer, the term of this patent is extended or adjusted under 35 U.S.C. 154(b) by 874 days.

(21) Appl. No.: 12/364,635

(22) Filed: Feb. 3, 2009

(65) Prior Publication Data
US 2010/0197353 A1 Aug. 5, 2010

(51) Int. Cl.
*H04B 1/38* (2006.01)
(52) U.S. Cl. ..... 455/566; 455/564; 455/565; 455/550.1; 455/575.1; 715/864; 345/173
(58) Field of Classification Search .......... 455/564–566, 455/418–420, 575.1, 90.3; 345/156, 173; 715/702
See application file for complete search history.

(56) References Cited

U.S. PATENT DOCUMENTS

| | | | | |
|---|---|---|---|---|
| 6,781,575 B1 * | 8/2004 | Hawkins et al. | | 345/173 |
| 6,963,332 B1 * | 11/2005 | Watanabe | | 345/161 |
| 7,203,521 B2 * | 4/2007 | Lee et al. | | 455/564 |
| 7,720,552 B1 * | 5/2010 | Lloyd | | 700/10 |
| 8,210,431 B2 * | 7/2012 | Earl | | 235/386 |
| 2007/0152983 A1 * | 7/2007 | McKillop et al. | | 345/173 |
| 2007/0155434 A1 * | 7/2007 | Jobs et al. | | 455/565 |
| 2007/0202852 A1 * | 8/2007 | Li | | 455/414.1 |
| 2008/0204423 A1 * | 8/2008 | Kim | | 345/173 |
| 2008/0276168 A1 * | 11/2008 | Mansfield et al. | | 715/702 |
| 2010/0087230 A1 * | 4/2010 | Peh et al. | | 455/566 |
| 2010/0173668 A1 * | 7/2010 | Marui et al. | | 455/556.1 |
| 2011/0173559 A1 * | 7/2011 | Schaefer et al. | | 715/780 |

OTHER PUBLICATIONS

Jelsoft Enterprises Ltd., Apple & iPhone Forums, News, Mods, Hacks, Themes, Skins, and Downloads is what we do! Modmyi.com, Oct. 2009.
Geekalerts Gadgets and Design, iRetroPhone—Rotary Dial Phone App for iPhone, published by Robert Birming Jun. 24, 2008. http://www.modmyi.com/forums/native-iphone-ipod-touch-app-launches/46651-idial-nostalgic-dialer-your-iphone.html.

* cited by examiner

*Primary Examiner* — Sharad Rampuria
(74) *Attorney, Agent, or Firm* — Ridout & Maybee LLP (57) ABSTRACT

A portable electronic device that allows a user to dial a telephone number using a virtual rotary dial pad configuration. The device includes a physically depressible touch screen display. Speed dialing is enabled by touching and dragging a selected numeric or non-numeric symbol to a predetermined location on the touch screen display and by holding the selected symbol at the predetermined location for a predetermined duration of time. Successful dialing of a symbol results in tactile, audio or visual feedback. Touching and dragging selected symbols may be replaced by touching the selected symbol and physically depressing the touch screen. Both numeric and non-numeric symbols may be dialed.

12 Claims, 6 Drawing Sheets

METHOD AND APPARATUS FOR IMPLEMENTING A VIRTUAL ROTARY DIAL PAD ON A PORTABLE ELECTRONIC DEVICE

RESERVATION OF COPYRIGHT

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

FIELD OF THE INVENTION

Embodiments relate generally to the implementation of a virtual rotary dial pad on a portable electronic device and related methods and apparatuses disclosed herein.

BACKGROUND OF THE INVENTION

Portable electronic devices such as mobile telephones or personal digital assistants (PDAs) generally include a keypad for user input. Traditionally, the keypad is a set of physical keys or buttons that a user may push in order to make user selections. For instance, a cellular telephone may include a grid of physical keys or buttons that may be pushed in order to dial a phone number. However, in more recent portable electronic devices, the keypad is implemented as a virtual keypad displayed on a touch screen. The touch screen of the portable electronic device displays regions that may be touched by a user. The regions may be associated with digits 0-9, although other associations are possible (e.g., *, #, etc.). Selection of a region by a user results in the dialing of the corresponding digit in a phone number. The regions act as buttons or keys and generate a signal when touched. The signals generated are interpreted by the portable electronic device and result in the dialing of a phone number defined by the numbers associated with the touched regions.

Generally, a touch screen of a portable electronic device displays the virtual push button dial pad when the device is in a phone number dialing mode. In this mode, not only does the device display a dialing key pad, but the device also interprets user input through the dialing keypad in order to assemble and dial phone numbers. When the device is not in a phone number dialing mode, the virtual dial pad is not displayed and user input does not automatically result in the dialing of a phone number.

In many cases, the virtual dial pad displayed on a portable electronic device touch screen is similar in orientation and function to a standard touch tone telephone dialing pad. That is, the numbered buttons are arranged in four rows of keys, three columns wide. Numbers 0-9 are represented on the virtual "keys." A "star" ("*") key and a "pound" ("#") key are usually also displayed. Other alpha-numeric symbols may also be associated with the virtual keys. Using this standard orientation, a user may dial a phone number by pushing the appropriate virtual keys. Thus, a user may dial a phone number using a touch screen of the portable electronic device in a way that is similar to most other touch tone dial pads function.

DETAILED DESCRIPTION OF THE INVENTION

Example embodiments and applications will now be described. It should be appreciated that other embodiments may be realized and structural or logical changes may be made to the disclosed embodiments.

An advantage of using a touch screen to display a virtual dial pad is that the dial pad need not be limited to a specific orientation such as the standard dial pad orientation. Because there is a desire, and even a need, for additional virtual dial pads to be used on a portable electronic device with a touch screen, embodiments of virtual rotary dial pads integrated into the portable electronic device are disclosed below.

Figure 1:
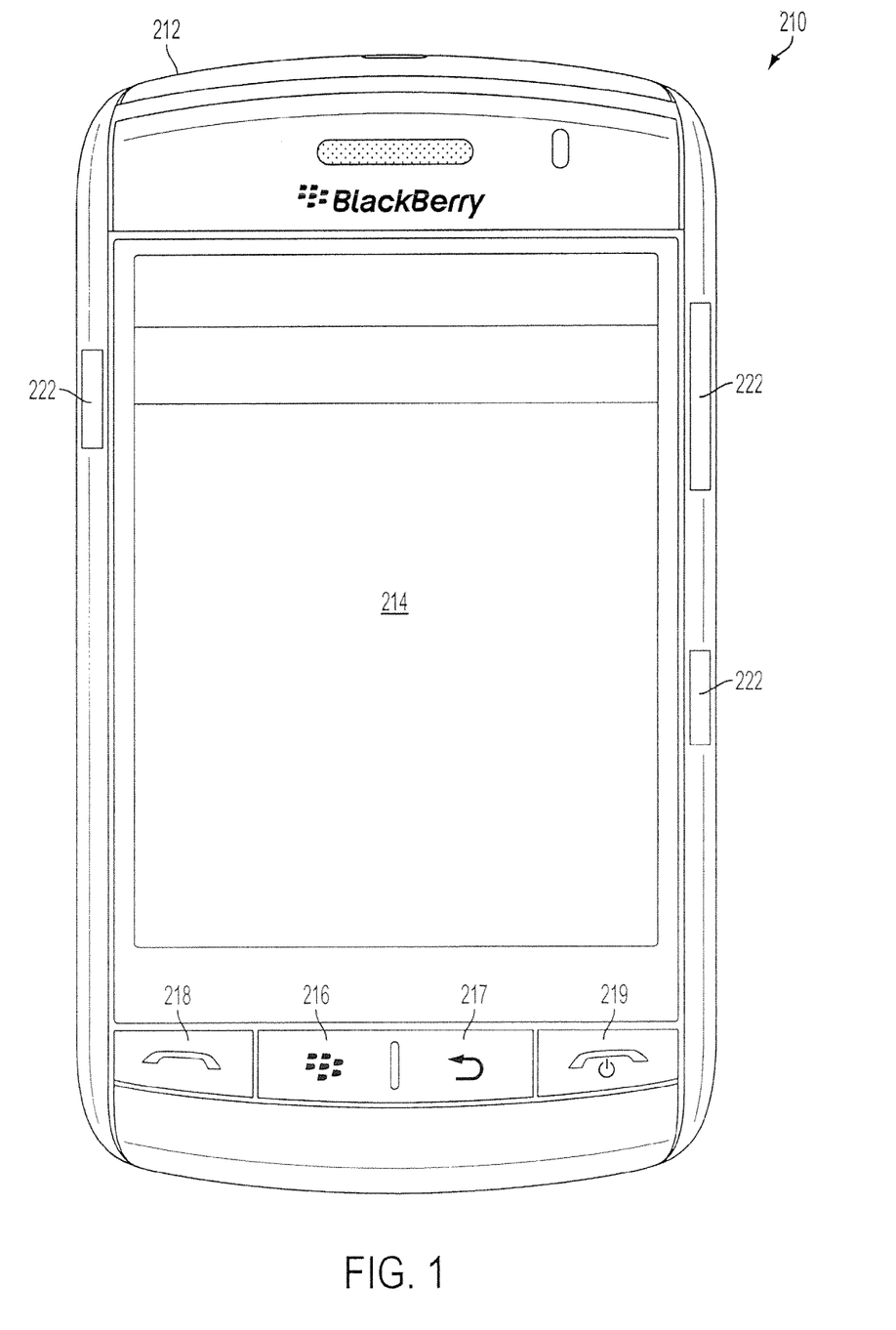
FIG. 1 illustrates a portable electronic device for communicating with a network in accordance with an embodiment disclosed herein.

FIG. 1 illustrates a portable electronic device 210 according to a disclosed embodiment. The portable electronic device 210 is a dual mode (simultaneous data and voice communication capabilities) device, personal digital assistant, etc. Such devices include BlackBerry™ devices by Research in Motion Limited of Ontario, Canada, or Palm® Treo™ devices by Palm, Inc. of California, U.S.A. to name a few. In addition, the portable electronic device 210 may be a cellular telephone. The device 210 includes a portable housing 212 and a touch screen display 214 such as a capacitive or resistive touch screen display. The device 210 may also include a physical keyboard, though, as explained below, a physical keyboard can be replaced by a virtual keyboard on the touch screen display 214. The device 210 may include additional physical buttons such as a menu button 216, a go back button 217, a dial button 218 and an end call button 219. The menu button 216, when pushed, results in the display of a menu on the touch screen display 214. The go back button 217 allows a user to go back to a previously viewed image or page on the display 214. The dial button 218 and end call button 219, as explained in more detail below, are used to begin and end phone calls. The device 210 also includes a plurality of additional physical buttons 222 that may be used to activate certain default applications or features of the device 210 when pushed, or which may be customizable to perform desired functions when pushed. The touch screen display 214 displays menus and applications that may be selected by a user through touching the appropriate region of the touch screen display 214.

Figure 2:
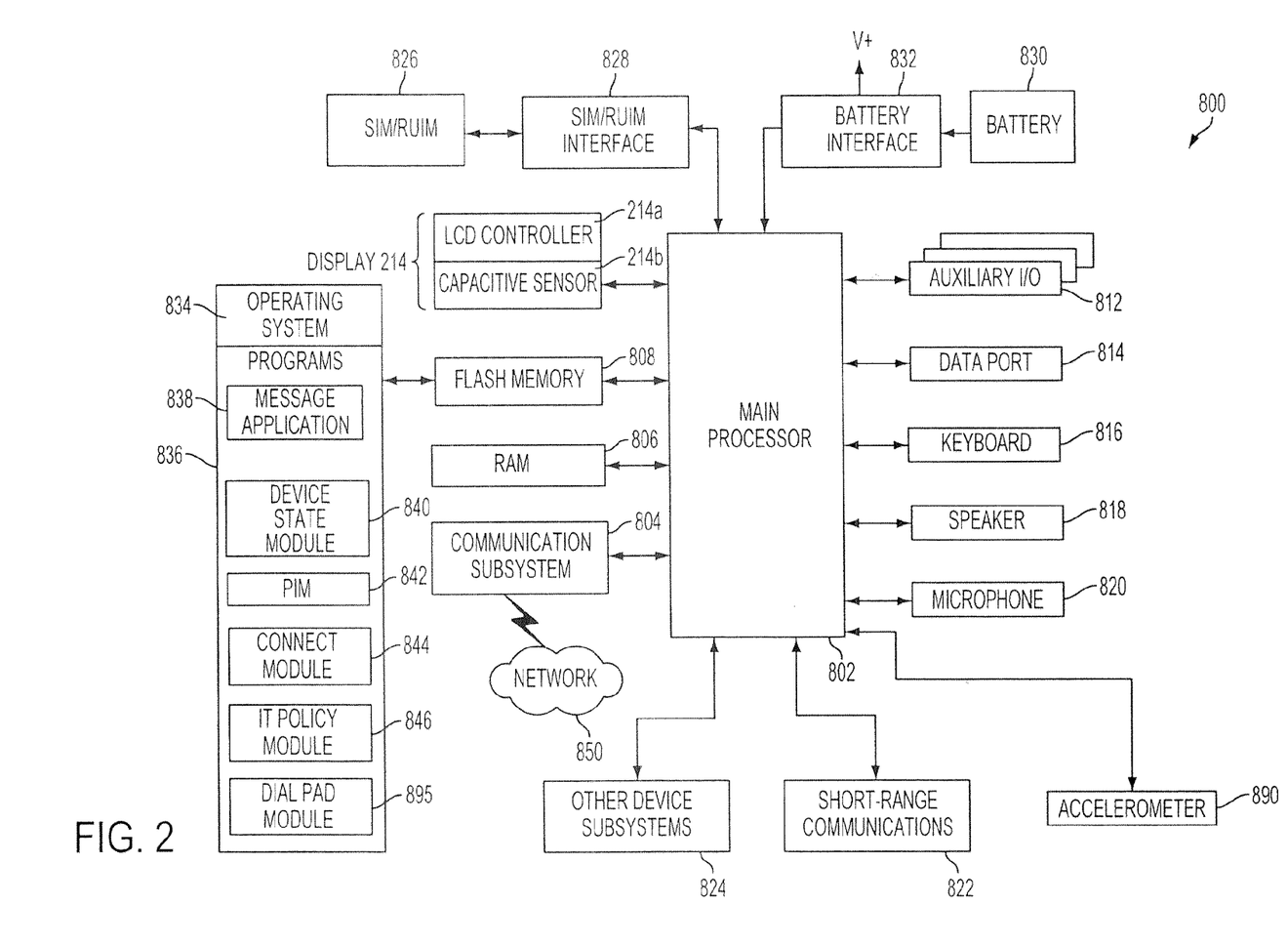
FIG. 2 illustrates the internal components of the portable electronic device in accordance with an embodiment disclosed herein.

The device 210 also includes internal components that may be implemented through a combination of both hardware and software. Internal components 800 of the device 210 are illustrated in FIG. 2. The portable electronic device 210 includes a number of components such as a main processor 802 that controls the overall operation of the portable electronic device 210. Communication functions, including data and voice communications, are performed through a communication subsystem 804. The communication subsystem 804 receives messages from and sends messages to a wireless network 850. In this example embodiment of the portable electronic device 210, the communication subsystem 804 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behavior described herein, and it will also be understood by persons skilled in the art that the embodiments described herein are intended to use any other suitable standards that are developed in the future. The wireless link connecting the communication subsystem 804 with the wireless network 850 represents one or more different Radio Frequency (RF) channels, operating according to defined protocols specified for GSM/GPRS communications. With newer network protocols, these channels are capable of supporting both circuit switched voice communications and packet switched data communications.

Although the wireless network 850 associated with portable electronic device 210 is a GSM/GPRS wireless network in one example implementation, other wireless networks may also be associated with the portable electronic device 210 in variant implementations. The different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and third-generation (3G) networks like EDGE and UMTS. Some other examples of data-centric networks include WiFi 802.11, Mobitex™ and DataTAC™ network communication systems. Examples of other voice-centric data networks include Personal Communication Systems (PCS) networks like GSM and Time Division Multiple Access (TDMA) systems.

The main processor 802 also interacts with additional subsystems such as a random access memory (RAM) 806, a flash memory 808, the touch screen display 214, an auxiliary input/output (I/O) subsystem 812, a data port 814, a speaker 818, a microphone 820, short-range communications 822, an accelerometer 890 and other device subsystems 824 (including, but not limited to a camera and a device vibrator).

Some of the subsystems of the portable electronic device 210 perform communication-related functions, whereas other subsystems may provide "resident" or on-device functions. By way of example, the touch screen display 214 may be used for both communication-related functions, such as entering a text message for transmission over the network 850, and device-resident functions such as a calculator or task list.

The portable electronic device 210 can send and receive communication signals over the wireless network 850 after required network registration or activation procedures have been completed. Network access is associated with a subscriber or user of the portable electronic device 210. To identify a subscriber, the portable electronic device 210 requires a SIM/RUIM card 826 (i.e., Subscriber Identity Module or a Removable User Identity Module) to be inserted into a SIM/RUIM interface 828 in order to communicate with a network. The SIM card or RUIM 826 is one type of a conventional "smart card" that can be used to identify a subscriber of the portable electronic device 210 and to personalize the portable electronic device 210, among other things. Without the SIM card 826, the portable electronic device 210 is not fully operational for communication with the wireless network 850. By inserting the SIM card/RUIM 826 into the SIM/RUIM interface 828, a subscriber can access all subscribed services. Services may include: web browsing and messaging such as e-mail, voicemail, Short Message Service (SMS), and Multimedia Messaging Services (MMS). More advanced services may include: point of sale, field service and sales force automation. The SIM card/RUIM 826 includes a processor and memory for storing information. Once the SIM card/RUIM 826 is inserted into the SIM/RUIM interface 828, it is coupled to the main processor 802. In order to identify the subscriber, the SIM card/RUIM 826 can include some user parameters such as an International Mobile Subscriber Identity (IMSI). An advantage of using the SIM card/RUIM 826 is that a subscriber is not necessarily bound by any single physical mobile device. The SIM card/RUIM 826 may store additional subscriber information for a mobile device as well, including datebook (or calendar) information and recent call information. Alternatively, user identification information can also be programmed into the flash memory 808.

According to a preferred embodiment, the portable electronic device 210 is a battery-powered device and includes a battery interface 832 for receiving one or more rechargeable batteries 830. In at least some embodiments, the battery 830 can be a smart battery with an embedded microprocessor. The battery interface 832 is coupled to a regulator (not shown), which assists the battery 830 in providing power V+ to the portable electronic device 210. Although current technology makes use of a battery, future technologies such as micro fuel cells may provide the power to the portable electronic device 210.

The portable electronic device 210 also includes an operating system 834 and software components 836 to 846, 895 which are described in more detail below. The operating system 834 and the software components 836 to 846, 895 that are executed by the main processor 802 are typically stored in a persistent storage such as the flash memory 808, which may alternatively be a read-only memory (ROM) or similar storage element (not shown). Those skilled in the art will appreciate that portions of the operating system 834 and the software components 836 to 846, 895 such as specific device applications, or parts thereof, may be temporarily loaded into a volatile store such as the RAM 806. Other software components can also be included, as is well known to those skilled in the art.

The subset of software applications 836 that control basic device operations, including data and voice communication applications, will normally be installed on the portable electronic device 210 during its manufacture. Other software applications include a message application 838 that can be any suitable software program that allows a user of the portable electronic device 210 to send and receive electronic messages. Various alternatives exist for the message application 838 as is well known to those skilled in the art. Messages that have been sent or received by the user are typically stored in the flash memory 808 of the portable electronic device 210 or some other suitable storage element in the portable electronic device 210. In at least some embodiments, some of the sent and received messages may be stored remotely from the portable electronic device 210 such as in a data store of an associated host system that the portable electronic device 210 communicates with.

The software applications can further include a device state module 840, a Personal Information Manager (PIM) 842, and other suitable modules (not shown). The device state module 840 provides persistence, i.e., the device state module 840 ensures that important device data is stored in persistent memory, such as the flash memory 808, so that the data is not lost when the portable electronic device 210 is turned off or loses power.

The PIM 842 includes functionality for organizing and managing data items of interest to the user, such as, but not limited to, e-mail, contacts, calendar events, voicemails, appointments, and task items. A PIM application has the ability to send and receive data items via the wireless network 850. PIM data items may be seamlessly integrated, synchronized, and updated via the wireless network 850 with the mobile device subscriber's corresponding data items stored and/or associated with a host computer system. This functionality creates a mirrored host computer on the portable electronic device 210 with respect to such items. This can be particularly advantageous when the host computer system is the mobile device subscriber's office computer system.

The portable electronic device 210 also includes a connect module 844, and an IT policy module 846. The connect module 844 implements the communication protocols that are required for the portable electronic device 210 to communicate with the wireless infrastructure and any host system, such as an enterprise system, that the portable electronic device 210 is authorized to interface with.

The connect module 844 includes a set of APIs that can be integrated with the portable electronic device 210 to allow the portable electronic device 210 to use any number of services associated with the enterprise system. The connect module 844 allows the portable electronic device 210 to establish an end-to-end secure, authenticated communication pipe with the host system. A subset of applications for which access is provided by the connect module 844 can be used to pass IT policy commands from the host system to the portable electronic device 210. This can be done in a wireless or wired manner. These instructions can then be passed to the IT policy module 846 to modify the configuration of the portable electronic device 210. Alternatively, in some cases, the IT policy update can also be done over a wired connection.

The IT policy module 846 receives IT policy data that encodes the IT policy. The IT policy module 846 then ensures that the IT policy data is authenticated by the portable electronic device 210. The IT policy data can then be stored in the flash memory 806 in its native form. After the IT policy data is stored, a global notification can be sent by the IT policy module 846 to all of the applications residing on the portable electronic device 210. Applications for which the IT policy may be applicable then respond by reading the IT policy data to look for IT policy rules that are applicable.

The IT policy module 846 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some embodiments, the IT policy module 846 can determine which applications are affected by the IT policy data and send a notification to only those applications. In either of these cases, for applications that aren't running at the time of the notification, the applications can call the parser or the IT policy module 846 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 846 sends an acknowledgement back to the host system to indicate that the IT policy data was received and successfully applied.

The dial pad module 895 may be a part of the connect module 844 or may be a separate module, as illustrated in FIG. 2. In either scenario, the dial pad module 895 is used by the connect module 844 when a user of the portable electronic device desires to dial and connect to a telephone number. The dial pad module 895 includes instructions to implement one or more telephone number dialing methods. Examples of dialing methods that may be implemented are described below.

Other types of software applications can also be installed on the portable electronic device 210. These software applications can be third party applications, which are added after the manufacture of the portable electronic device 210. Examples of third party applications include games, calculators, utilities, etc, as well as third party APIs. Other examples of third party applications include updates to the dial pad module 895. The updates to the dial pad module 895 may include embedded software applications that provide replacement dialing instructions for the dial pad module 895.

The additional applications can be loaded onto the portable electronic device 210 through at least one of the wireless network 850, the auxiliary I/O subsystem 812, the data port 814, the short-range communications subsystem 822, or any other suitable device subsystem 824. This flexibility in application installation increases the functionality of the portable electronic device 210 and may provide enhanced on-device functions, communication-related functions, or both. For example, secure communication applications may enable electronic commerce functions and other such financial transactions to be performed using the portable electronic device 210.

The data port 814 enables a subscriber to set preferences through an external device or software application and extends the capabilities of the portable electronic device 210 by providing for information or software downloads to the portable electronic device 210 other than through a wireless communication network. The alternate download path may, for example, be used to load an encryption key onto the portable electronic device 210 through a direct and thus reliable and trusted connection to provide secure device communication.

The data port 814 can be any suitable port that enables data communication between the portable electronic device 210 and another computing device. The data port 814 can be a serial or a parallel port. In some instances, the data port 814 can be a USB port that includes data lines for data transfer and a supply line that can provide a charging current to charge the battery 830 of the portable electronic device 210.

The short-range communications subsystem 822 provides for communication between the portable electronic device 210 and different systems or devices, without the use of the wireless network 850. For example, the subsystem 822 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 804 and input to the main processor 802. The main processor 802 will then process the received signal for output to the display 214. A subscriber may also compose data items, such as e-mail messages, for example, using a virtual keyboard on the display 214 or a physical keyboard 816 in conjunction with the display 214 and possibly the auxiliary I/O subsystem 812. The auxiliary subsystem 812 may include devices such as: a mouse, depressible trackball, a depressible display, infrared fingerprint detector, a depressible thumb navigator or other buttons. A composed item may be transmitted over the wireless network 850 through the communication subsystem 804.

For voice communications, the overall operation of the portable electronic device 210 is substantially similar, except that the received signals are output to the speaker 818, and signals for transmission are generated by the microphone 820. Alternative voice or audio I/O subsystems, such as a voice message recording subsystem, can also be implemented on the portable electronic device 210. Although voice or audio signal output is accomplished primarily through the speaker 818, the display 214 can also be used to provide additional information such as the identity of a calling party, duration of a voice call, or other voice call related information.

The accelerometer 890 is for measuring the magnitude and direction of acceleration of the portable electronic device 210. Methods of manufacturing accelerometers are known in the art. One common type of accelerometer 890 is a microelectrical-mechanical system (MEMS) that includes a cantilever beam and a proof mass. Under the influence of gravity or acceleration, the proof mass deflects from its neutral position. This deflection is measured in an analog or digital manner, which is sent to the main processor 802 as data signals.

The touch screen display 214 communicates with the main processor 802 via an LCD controller 214a and a sensor 214b. In the illustrated embodiment, the touch screen display 214 is a capacitive touch screen display and the sensor 214b is a capacitive sensor. The LCD controller 214a operates to control the rendering of images, text, data, etc. on the display 214. The capacitive sensor 214b indicates to the main processor 802 if the touch screen display 214 has been touched and where it has been touched in relation to the images and text rendered by the LCD controller 214a.

The touch screen display 214 can also be used as a depressible display. In essence, the entire display 214 may be depressed or "clicked" as a physical button. Thus, not only may a user activate virtual keys by touching appropriate regions on the touch screen display 214, the user may also use the entire display 214 as a physical button. "Clicking" the display 214 results in communication with the main processor 802. Clicking the display 214 also provides an audible and tactile feedback that conveys to the user that the display 214 has been depressed. As incorporated in examples below, the tactile feedback mechanism can be very useful.

The process for dialing a phone number using the portable electronic device 210 will now be described. Generally, when a user of the device 210 desires to dial a phone number, the user will first instruct the device 210 to enter a dialing mode, as defined by the dial pad module 895. The dialing mode may be entered by touching an appropriate new item or key on the device 210. The key may be a virtual key on the touch screen display 214, or a physical key such as one of the customizable buttons 222. The dialing mode may also be entered by the user speaking a command such as "Dial" when the device 210 is in a voice activated mode.

Once the dialing mode has been entered, a default dialing pad is displayed on the touch screen display 214. The default dialing pad may be one of any number of dialing pads that are available to the user. The user may change the default dialing pad by navigating the appropriate menus and options displayed on the display 214. However, the selected default dialing pad will always be the dialing pad that is displayed when the dialing mode is entered.

Figure 3:
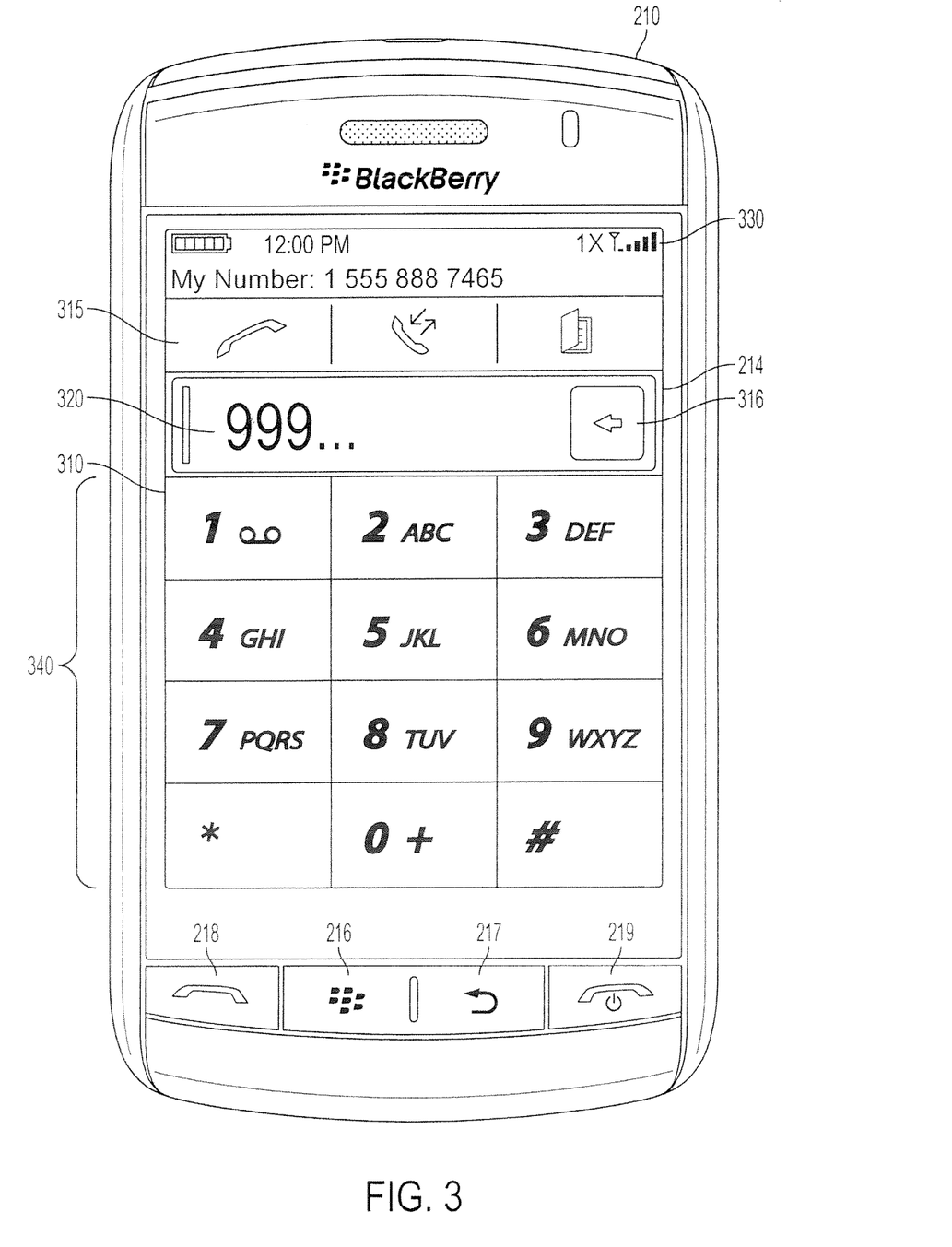
FIG. 3 illustrates a conventional dial pad configuration on a portable electronic device.

The traditional dialing pad configuration 310 is illustrated in FIG. 3. In FIG. 3, the portable electronic device 210 is displaying a dialing pad configuration 310 within dialpad area 340 on its touch screen display 214. The configuration 310 includes a standard layout of digits in rows and columns of virtual keys. As a user presses the first digit of the desired phone number, the pressed digit appears in input field 320 on the display 214 (in FIG. 3, above the dial pad) as confirmation that the digits have been selected for dialing. Input field 320, located above dialpad 340, contains delete button 316, which can be pressed to delete the last-entered digit. A series of tabs or buttons 315 are positioned above input field 320, and can be configured as user-selectable shortcuts to other telephone related applications, such as the call log or contact list, or as send or end buttons. A banner of status information 330 is optionally displayed above input field 320 and can include information such as a battery life indicator, clock, or signal strength display. Generally, the user first selects all digits in the phone number and then presses a dial or send button 315 (or physical button 218 of FIG. 1). Alternatively, the user may press the dial or send button 315 and then select the digits to be dialed. Once all necessary digits have been selected by the user and the dial or send button 315 has been touched, the device 210 will dial the desired telephone number.

Figure 4A:
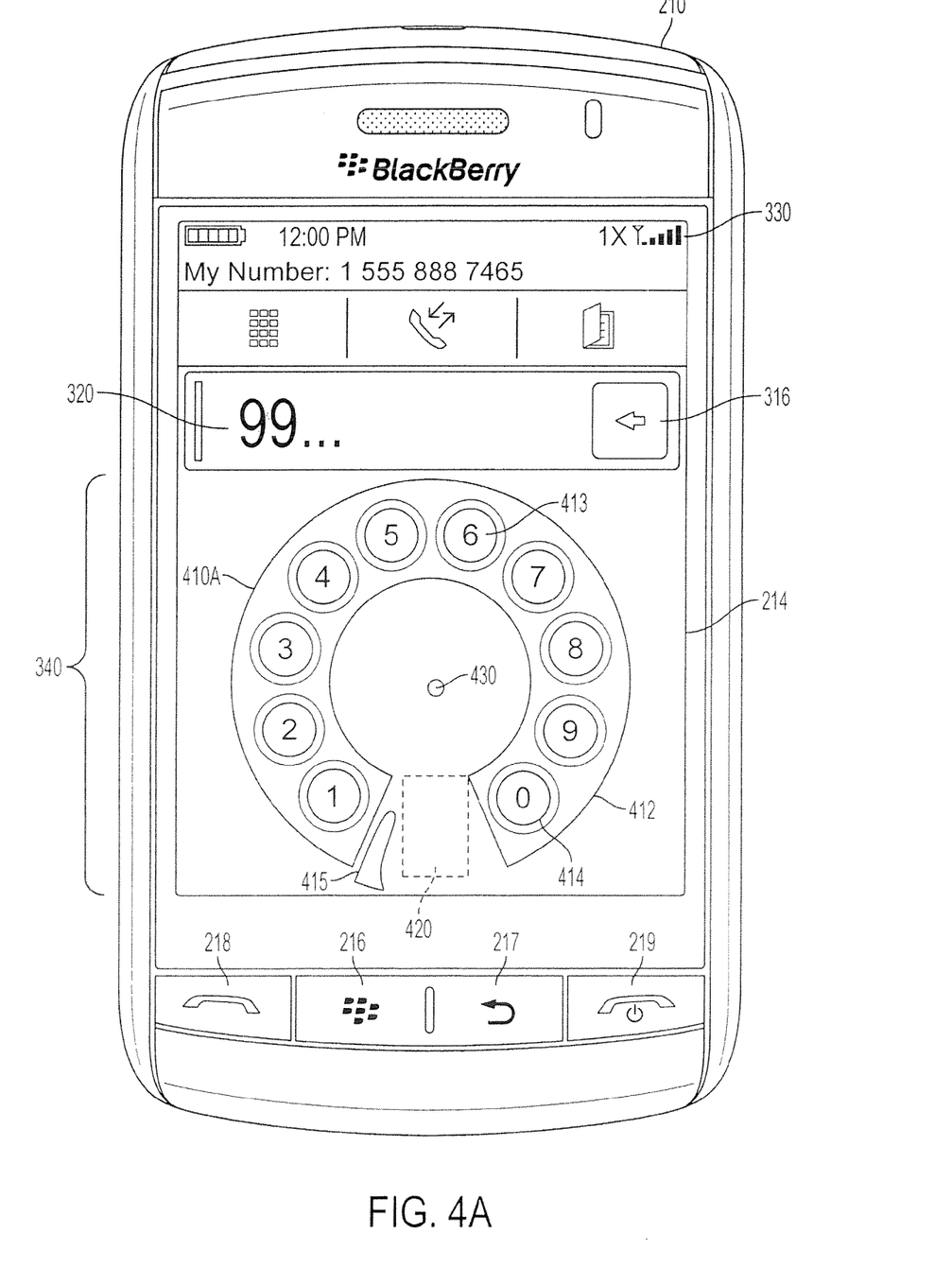
FIGS. 4A, 4B and 4C illustrate dial pad configurations in accordance with an embodiment disclosed herein.

Other dialing pad configurations are also available for display and use in dialpad area 340. FIG. 4A illustrates a virtual rotary dial pad configuration 410A on the device 210. The rotary dial pad is meant to resemble the rotary dial telephones that were prevalent before touch-tone telephones became popular. The configuration 410A includes a horseshoe-like arc 412 over stationary numbers 413 on the display 214. The arc 412 includes finger holes 414, which are initially aligned with the numbers 413. It should be appreciated that the arc 412 could be a circle (e.g., circle 412B illustrated in FIG. 4B), or other desirable shape. To select a number to dial, a user will touch the finger hole 414 over the desired digit and then drag counterclockwise along the arc of numbers until the selected digit has been dragged to a stopping point 415 near the lower left-hand corner of the display 214. As the user drags their finger towards stopping point 415, the finger holes 414 of arc 412 over the numbers will appear to rotate. Alternatively, the digits themselves will rotate so that the dragging of the selected digit results in turning of the arc 412. Once the user has dragged the arc 412 to stopping point 415, the selected dialed digit will appear in input field 320. The selected dialed digit may also appear at another predetermined region 420 on the display 214. The user repeats this dialing process with each desired digit. Once all digits have been dialed the device 210 will dial the telephone number represented by the selected digits.

Figure 4B:
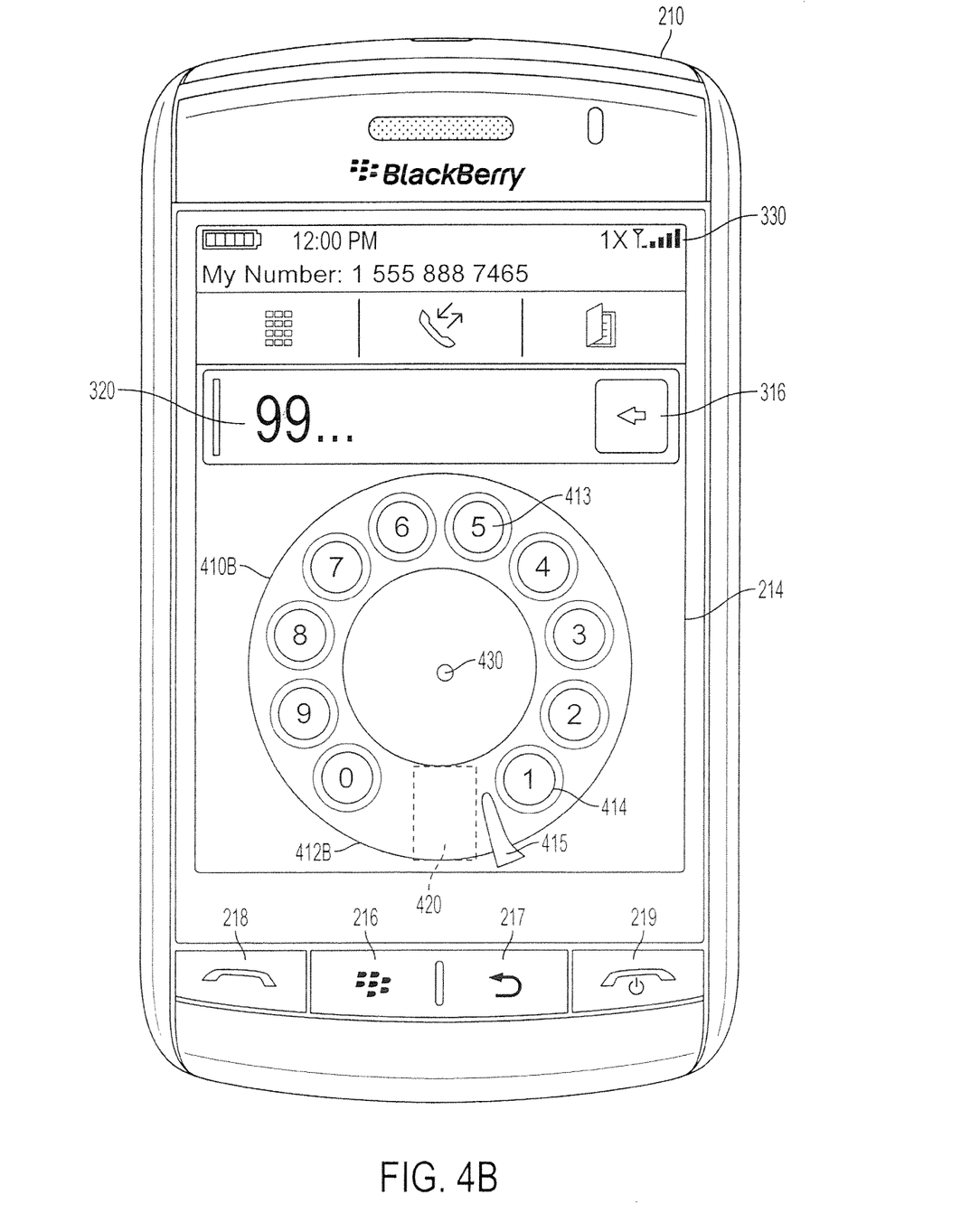

Of course, the digits displayed in configuration 410A could be rearranged or dialing could be performed in a clockwise manner, as is illustrated in FIG. 4B. The virtual rotary dial pad configuration 410B in FIG. 4B illustrates how the digits may be reversed and dialing may also be reversed. FIG. 4B also illustrates the use of a circle 412B comprising finger holes 414 as described above. Other variations may be made as well.

Traditional rotary dial pads (on a traditional telephone) do suffer from a few flaws or disadvantages that can be cured in the virtual rotary dial pad configuration 410A or 410B. For example, on a traditional rotary dial pad, there is no practical method of performing a speed dial. "Speed dial" is a shortcut method of dialing a telephone number and is often enabled in touch tone telephone dial pads. On a touch tone telephone with a programmable memory, it is possible to program one or more shortcut keys to represent an entire telephone number. When a user desires to dial the represented number, the user need only press the shortcut keys and the number is dialed. However, on a traditional rotary dial pad, there is no practical method for incorporating shortcut keys or speed dial solutions.

Another disadvantage of a traditional rotary dial pad configuration is that there is no method for dialing special characters. In a typical rotary dial pad, only digits may be dialed. There is no method for dialing other symbols such as a pound "#" or star "*" key.

Yet a further problem of a traditional rotary dial pad configuration is that, in order for a digit to be dialed, it is imperative that a user rotate the rotary dial pad all the way to a stopping bar for each digit. If a user fails to rotate the dial pad the entire distance, the rotary dial pad may dial incorrect digits, or may not dial a digit at all.

An additional concern of traditional rotary dial pads is that use of these pads is slow. It takes time to rotate and then await counter-rotation of the dial pad for each digit dialed.

The virtual rotary dial pad configurations 410A and 410B can solve each of these concerns of traditional rotary dial pads.

Figure 4C:
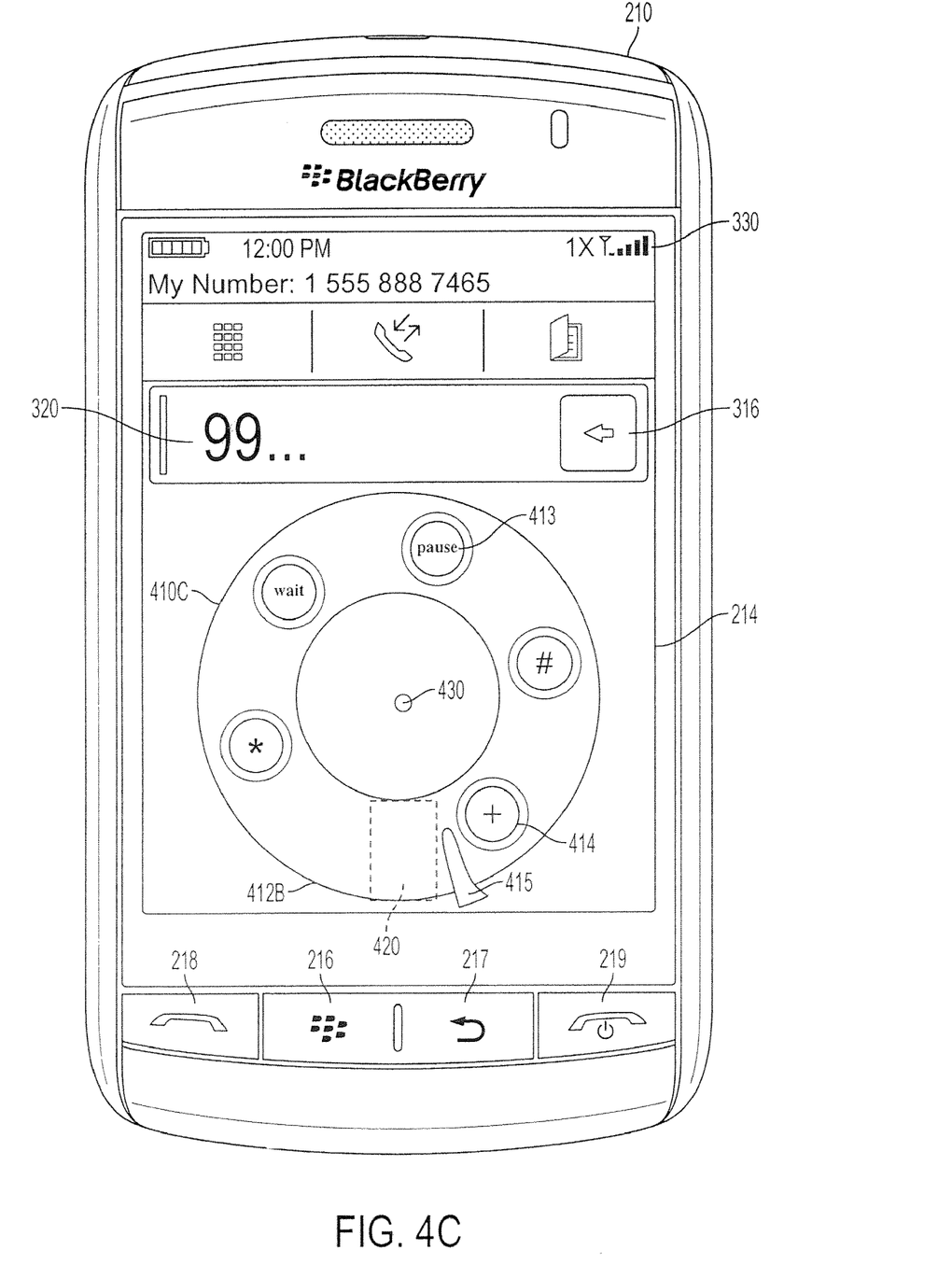

Additional symbols can be displayed and dialed using the virtual rotary dial pad configurations 410A and 410B. As a default, configurations 410A and 410B display digits 0-9, with each digit corresponding to a dialing button/finger hole 414 that may be touched and dragged/rotated to the stopping point 415. However, additional symbols may be made available for dialing by touching or physically clicking the center 430 of the dial pad 410A/410B. By touching or clicking the center 430, a second virtual rotary dial pad 410C is made available with additional symbols for dialing, as is illustrated in FIG. 4C. The additional symbols may include a pound key "#," a star key "*," a pause key <pause>, a wait key <wait>, and an add key "+," among others. Touching or clicking the center 430 of configuration 410C will return the dialpad area 340 to configurations 410A or 410B.

Speed dial functionality can also be incorporated into the virtual rotary dial pad configurations 410A, 410B and 410C. Each digit or symbol 413 displayed in configurations 410A, 410B and 410C can be programmed as a shortcut or speed dial button for a respective telephone number. Programming can occur through menus and data pages displayed on the display 214. Once programmed, the speed dial functionality is activated by dialing a single digit or symbol 413 representing a respective phone number. The shortcut digit or symbol 413 is dragged or rotated to the stopping point 415. Instead of releasing the dragged digit, however, as a user would normally do when dialing a telephone number, the user holds the dialed digit near the stopping point 415 for an additional period of time (for example, for an extra one or two seconds). This "hovering" of the dialed digit or symbol 413 near the stopping point 415 is interpreted by the processor 802 as an instruction to implement speed dialing for the represented telephone number. The represented telephone number is dialed in full by the device 210 with the user having only dialed a single digit or symbol—something today's rotary dial telephones (traditional or virtual) simply cannot do.

In order to help a user know whether the user has dragged or rotated a selected digit or symbol 413 far enough (e.g., all the way to the stopping point 415), the device 210 can be configured to vibrate once a digit or symbol has been recognized as being dialed. Other sensory feedback mechanisms may also be used. For example, audible sounds may be triggered when a digit or symbol 413 has been dragged to the stopping point 415. Alternatively, a visual indicator could be shown on the display 214 once a digit or symbol has been dragged to the stopping point 415.

In order to facilitate faster dialing using the virtual rotary dial pad configurations 410A, 410B and 410C, the device 210 allows a user to click the display 214 in addition to touching and dragging a digit or symbol. By clicking a selected digit or symbol 413 (i.e., by physically depressing the display 214), the selected digit or symbol 413 is automatically rotated to the stopping point 415 and then counter-rotated back to its starting position. In this way, the user is not required to actually do the dragging. Because the rotation of the digit is automatic and is not subject to user dragging, the dialing or rotation speed can be faster than if it were dependent on user dragging. The automatic dialing or rotation speed can even be modified to last a predetermined duration of time. In an embodiment, the device 210 will output a dialing sound as the digits are being rotated. The dialing sound can be the traditional telephone dialing sound made by most rotary telephones. The sound can also be beeps, music or other sounds as selected by the devices' 210 user. Vibrations or a blinking display 214 could also be used during the rotation, if desired.

Configurations 410A, 410B and 410C are each embedded in the dial pad module 895. Additional configurations are possible and may be added by third party applications or APIs.

Although the embodiments and applications as described above relate to a portable electronic device with data and voice communication capacity, it should be understood that they may also be embodied in and applied with any portable electronic device with an ability to dial telephone numbers.

Specific embodiments and applications related to the above description include, but are not limited to, a portable electronic device that includes a touch screen display, a communication system, and a virtual rotary dial pad presented on the display. The virtual dial pad enables a user of the device to dial numeric and non-numeric symbols and to call a telephone number using the display and the communication system. The virtual rotary dial pad comprises a predetermined location on the display to which the numeric and non-numeric symbols are rotated upon dialing. The virtual rotary dial pad is enabled to perform speed dialing. Speed dialing occurs by rotating a selected numeric or non-numeric symbol to the predetermined location and by holding the selected symbol at the predetermined location for a predetermined duration of time. The virtual rotary dial pad also generates feedback when a selected symbol has been dialed. The feedback can be either tactile (in the form of a vibration), audio, or visual. The device touch screen is also physically depressible. Rapid symbol dialing can occur by both touching the symbol to be dialed and depressing the display.

An additional embodiment includes a method of dialing a telephone number using a virtual rotary dial pad on a portable electronic device. The method includes touching a symbol on a touch screen display of the portable electronic device, wherein the available symbols are both numeric and non-numeric. The method also includes dragging the touched symbol to a predetermined location on the display, thereby resulting in the symbol being dialed. Dragging a selected symbol to the predetermined location results in each selectable symbol of the virtual rotary dial pad being rotated. The method includes performing a speed dial function by holding the dragged symbol at the predetermined location for a predetermined duration of time. The method also includes generating feedback to a user when the touched symbol is dragged to the predetermined location. The generated feedback is a vibration, an audio signal or a visual signal. The method also includes physically depressing the touch screen display, also resulting in the dialing of a selected symbol.

A system for using hardware of a portable electronic device to dial a telephone number is also described. The system includes a portable electronic device that includes a touch screen display, a processor, and a memory. The system also includes instructions stored in the memory and acted upon by the processor to render on the touch screen display a virtual rotary dial pad that enables dialing of both numeric and non-numeric symbols. The instructions also direct the device to generate tactile, audio or visual feedback upon the dialing of a symbol. The touch screen of the system is physically depressible. The instructions direct the device to dial symbols that are touched when the display is physically depressed.

A further embodiment is a computer medium that comprises a software module to perform a method of dialing a telephone number using a portable electronic device. The medium includes instructions for dialing a symbol that is displayed on the touch screen display, touched and dragged to a predetermined location. The available symbols are both numeric and non-numeric. The medium includes instructions for speed dialing, for presenting sensory feedback upon dialing of a symbol, and for accelerated dialing using a depressible touch screen display.

Yet another embodiment includes a method of using a depressible touch screen display of a portable electronic device to dial a telephone number. The method includes touching a symbol to be dialed, the symbol rendered on the touch screen display. The method also includes physically depressing the touch screen display in order to dial the selected number. Upon depressing the display, the selected symbol is rotated to a predetermined location on the display and then counter-rotated back to its original location on the display, thereby dialing the selected symbol.

A further embodiment includes a method of providing speed dial on a virtual rotary dial pad of a portable electronic device. The method includes touching a speed dial symbol, dragging the symbol to a predetermined location on a touch screen display of the device, and holding the selected symbol at the predetermined location for a predetermined duration of time. Virtual rotary dial pads that include both numeric and non-numeric symbols may be toggled by touching the center of the dial pads.

Other examples, embodiments and applications related to the above description but not heretofore explained in detail are nevertheless considered pertinent and are to be considered within the scope of the following claims.

What is claimed as new and desired to be protected by Letters Patent of the United States is:

1. A portable electronic device comprising:
   a touch screen display;
   a communication system that allows the portable electronic device to send and receive wireless communications; and
   a virtual rotary dial pad presented on the display, the dial pad enabling a user of the portable electronic device to dial numeric and non-numeric symbols and to call a telephone number using the display and the communication system;
   the virtual rotary dial pad having a specific location on the display to which a selected numeric or non-numeric symbol may be rotated;
   the virtual rotary dial pad enabled to perform a speed dial function responsive to rotation of the selected symbol to the specific location and holding the selected symbol at the specific location for a specific duration of time in conjunction with physical depression of the display.

2. The device of claim 1, wherein the virtual rotary dial pad rotates when individual numeric and non-numeric symbols are dialed.

3. The device of claim 1, further comprising a feedback generator that generates feedback to the user when a numeric or non-numeric symbol has been rotated to the specific location.

4. The device of claim 3, wherein the feedback generator is a vibrator of the device.

5. The device of claim 3, wherein the feedback generator is a speaker of the device.

6. The device of claim 3, wherein the feedback generator is the display.

7. A method of dialing a telephone number using a virtual rotary dial pad on a portable electronic device, the method comprising:
   touching a symbol on a touch screen display of the portable electronic device, the available symbols being both numeric and non-numeric;
   dragging the touched symbol to a specific location on the display, thereby resulting in the touched symbol being dialed; and
   performing a speed dial function responsive to the dragged symbol being held at the specific location for a specific duration of time in conjunction with physical depression of the display.

8. The method of claim 7, wherein the step of dragging the touched symbol to the specific location results in each selectable symbol of the virtual rotary dial pad being rotated.

9. The method of claim 7, further comprising generating feedback to a user when the touched symbol is dragged to the specific location.

10. The method of claim 9, wherein the generated feedback is one of a vibration, an audio, and a visual feedback.

11. A system for using hardware of a portable electronic device to dial a telephone number, the system comprising:
   a portable electronic device that includes a touch screen display, a processor, and a memory; and
   instructions stored in the memory and acted upon by the processor to:
      render on the touch screen display a virtual rotary dial pad that enables dialing of both numeric and non-numeric symbols; and
      perform a speed dial function responsive to one of said symbols being dragged to a specific location on the touch screen display and held at the specific location for a specific duration of time in conjunction with physical depression of the display.

12. The system of claim 11, wherein the instructions direct the device to generate tactile, audio or visual feedback upon the dialing of a symbol.

* * * * *